(12) United States Patent
Al Mulhem et al.

(10) Patent No.: US 11,371,319 B2
(45) Date of Patent: Jun. 28, 2022

(54) ROBOTIC PIGGING TOOL

(71) Applicant: Saudi Arabian Oil Company, Dhahran (SA)

(72) Inventors: Abdulrahman Abdulaziz Al Mulhem, Dhahran (SA); Wael O. Badeghaish, Khobar (SA); Mohamed Nabil Noui-Mehidi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/816,796

(22) Filed: Mar. 12, 2020

(65) Prior Publication Data

US 2021/0285306 A1 Sep. 16, 2021

(51) Int. Cl.
| | | |
|---|---|---|
| *E21B 37/02* | (2006.01) | |
| *E21B 37/06* | (2006.01) | |
| *E21B 37/10* | (2006.01) | |
| *F16L 55/32* | (2006.01) | |

(52) U.S. Cl.
CPC .............. *E21B 37/02* (2013.01); *E21B 37/06* (2013.01); *E21B 37/10* (2013.01); *F16L 55/32* (2013.01)

(58) Field of Classification Search
CPC .......... E21B 37/00; E21B 37/02; E21B 37/10; E21B 37/06; F16L 55/32
See application file for complete search history.

(56) References Cited

U.S. PATENT DOCUMENTS 2,764,465 A 9/1956 Rohrback et al.
3,105,554 A * 10/1963 McCall .................. E21B 41/02
166/169

(Continued)

FOREIGN PATENT DOCUMENTS

WO WO-94/21886 A1 9/1994
WO WO-2002/055915 A2 7/2002
(Continued)

OTHER PUBLICATIONS

International Search Report for PCT/IB2020/056199, 5 pages (dated Oct. 19, 2020).

(Continued)

*Primary Examiner* — Taras P Bemko
*Assistant Examiner* — Yanick A Akaragwe
(74) *Attorney, Agent, or Firm* — Choate, Hall & Stewart LLP; Charles E. Lyon; Peter A. Flynn

(57) ABSTRACT

An example system includes a moveable platform having an uphole end and a downhole end. The platform includes a drive arrangement for moving the platform in one or more directions along an interior wall of a casing string in a wellbore. The platform includes scraping arrangement for removing debris from the interior wall of the casing string. The platform includes a debris catching arrangement downhole of the scraping arrangement for collecting some or all of the debris removed. The platform may include a coating arrangement to deliver and apply a substance to at least a part of the wall of the casing string. The coating arrangement may include a reservoir holding one or more liquid substances and a valve to regulate flow of the one or more liquid substances. The liquid substance may include epoxy resin.

21 Claims, 1 Drawing Sheet

(56) References Cited

U.S. PATENT DOCUMENTS

| | | | | |
|---|---|---|---|---|
| 4,427,061 | A * | 1/1984 | Moore | E21B 31/107 |
| | | | | 166/113 |
| 4,443,312 | A | 4/1984 | Hennon | |
| 5,203,646 | A | 4/1993 | Landsberger et al. | |
| 6,101,951 | A | 8/2000 | Sigel | |
| 6,107,795 | A | 8/2000 | Smart | |
| 6,745,839 | B1 * | 6/2004 | Simpson | E21B 37/04 |
| | | | | 166/311 |
| 6,887,014 | B2 | 5/2005 | Holland | |
| 7,712,520 | B1 * | 5/2010 | Hettes | E21B 37/00 |
| | | | | 166/173 |
| 8,671,495 | B2 | 3/2014 | Martin et al. | |
| 2002/0108751 | A1 * | 8/2002 | Simpson | E21B 23/14 |
| | | | | 166/212 |
| 2010/0258293 | A1 | 10/2010 | Lynde et al. | |
| 2010/0263856 | A1 * | 10/2010 | Lynde | E21B 23/14 |
| | | | | 166/53 |
| 2012/0029702 | A1 * | 2/2012 | Tverlid | E21B 29/005 |
| | | | | 700/275 |
| 2012/0211229 | A1 | 8/2012 | Fielder et al. | |
| 2013/0092665 | A1 * | 4/2013 | Hassel | B23K 37/0531 |
| | | | | 219/121.11 |
| 2014/0096972 | A1 * | 4/2014 | Leiper | E21B 37/00 |
| | | | | 166/311 |
| 2014/0311528 | A1 * | 10/2014 | Hallundbæk | E21B 37/00 |
| | | | | 134/22.12 |
| 2018/0306005 | A1 * | 10/2018 | Costa De Oliveira | E21B 47/00 |
| 2018/0340115 | A1 * | 11/2018 | Fouchard | E21B 21/00 |
| 2019/0071948 | A1 * | 3/2019 | Phan | E21B 33/1277 |
| 2019/0169472 | A1 * | 6/2019 | El-Kady | C09J 11/04 |
| 2020/0332625 | A1 * | 10/2020 | Howitt | E21B 37/02 |

FOREIGN PATENT DOCUMENTS

| | | |
|---|---|---|
| WO | WO-2014/060293 A2 | 4/2014 |
| WO | WO-2017/015727 A1 | 2/2017 |

OTHER PUBLICATIONS

Written Opinion for PCT/IB2020/056199, 8 pages (dated Oct. 19, 2020).

Wikipedia, Continuous Track, 18 pages, <https://en.wikipedia.org/wiki/Continuous_track>. Retrieved on Aug. 17, 2021.

* cited by examiner

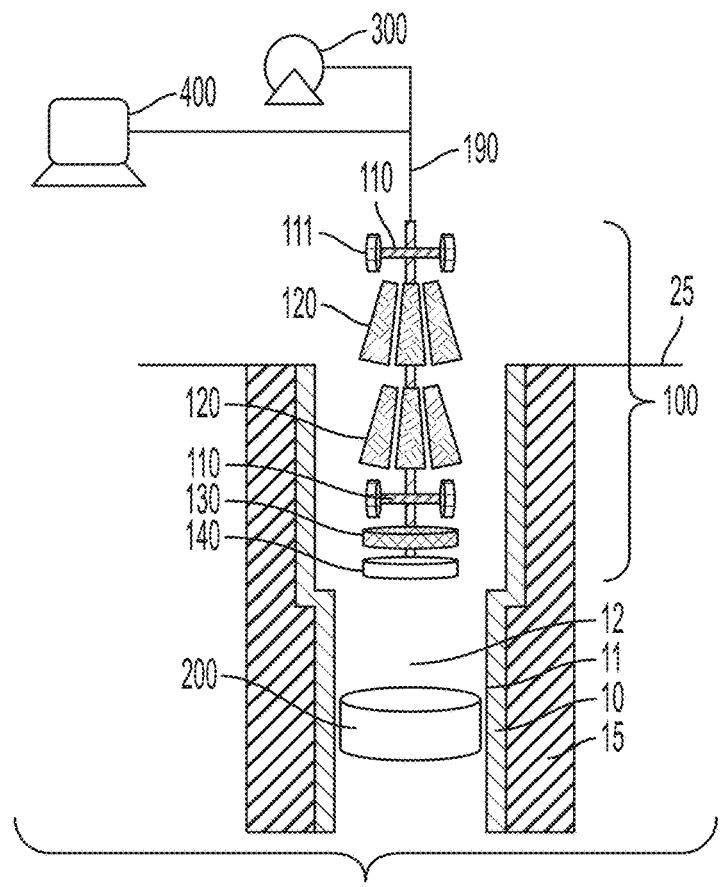
FIG. 1
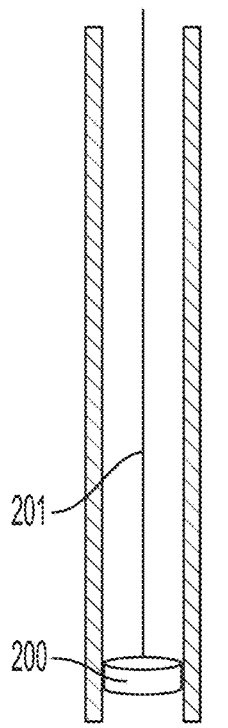
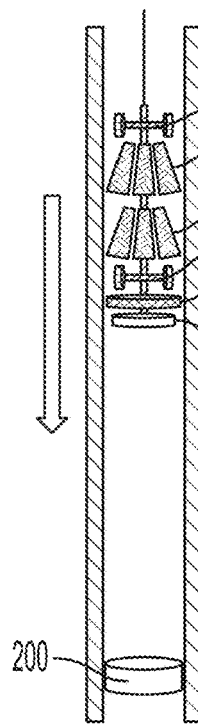
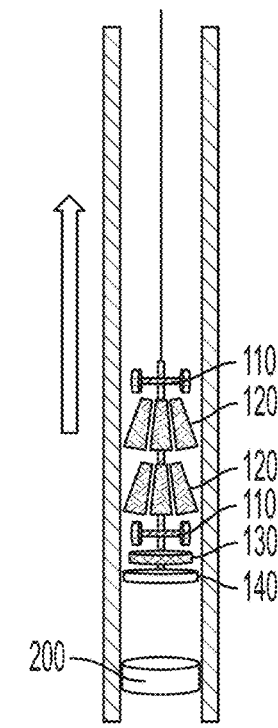
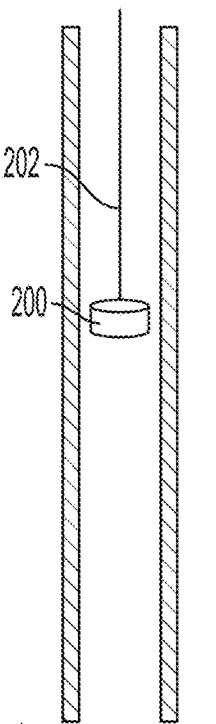
FIG. 2A   FIG. 2B   FIG. 2C   FIG. 2D

ROBOTIC PIGGING TOOL

TECHNICAL FIELD

This specification relates generally to example technologies for oil well maintenance.

BACKGROUND

During construction of a well, for example, an oil or gas well, a drill string having a drill bit bores through earth, rock, and other materials to form a wellbore. The drilling process includes, among other things, pumping drilling fluid down into the wellbore, and receiving return fluid and materials from the wellbore at the surface. In order for the well to become a production well or an injection well, the well must be completed. Part of the well construction process includes incorporating casing and tubing into the wellbore. Casing or liner supports the sides of the wellbore, and protects components of the well from outside contaminants. The casing may be cemented in place, and the cement may be allowed to harden as part of the well construction process.

One type of well is called an injection well. An injection well is a well in which fluids, for example, gas or water, are injected rather than produced. Example objectives of an injection well typically include maintaining reservoir pressure, lowering viscosity of oil, or disposing field water.

SUMMARY

An example system includes a moveable platform having an uphole end and a downhole end. The platform includes a drive arrangement for moving the platform in one or more directions along an interior wall of a casing string in a wellbore. The platform includes scraping arrangement for removing debris from the interior wall of the casing string. The platform includes a debris catching arrangement downhole of the scraping arrangement for collecting some or all of the debris removed.

The platform may include a coating arrangement to deliver and apply a substance to at least a part of the wall of the casing string. The coating arrangement may include a reservoir holding one or more liquid substances and a valve to regulate flow of the one or more liquid substances. The liquid substance may include epoxy resin.

The drive arrangement may include one or more wheels. The drive arrangement include one or more continuous track and wheel arrangements.

The scraping arrangement may include one or more brushes for brushing debris from the wall of the casing string. The one or more brushes may be stationary relative to the platform. The one or more brushes rotate, thereby removing debris from the wall of the casing string. The scraping arrangement may include one or more blades for scraping debris from the wall of the casing string.

The debris catching arrangement may be at least partially magnetic. The debris catching arrangement may include an electromagnetic device.

The system may include a plug positioned downhole of the platform for sealing an interior lumen of the casing. The plug may be removable.

The system may include a power source in electrical communication with the platform to provide electrical power to one or more components of the platform.

The system may include a control unit in data communication with the platform to control one or more components of the platform.

An example method for corrosion remediation in a casing string in a wellbore includes driving, along an interior wall of at least a first portion of a casing, a moveable platform having an uphole end and a downhole end. The platform includes a drive arrangement, a scraping arrangement, a debris catching arrangement downhole of the scraping arrangement; and a coating arrangement. The method includes removing, by the scraping arrangement, debris from the interior wall of the casing string. The method includes collecting, by the debris catching arrangement, at least some of the debris removed. The method includes coating, using the coating arrangement, at least a second portion of the casing with one or more liquids.

The method may include deploying a plug downhole of at least the first portion to seal off a lumen of the casing string. The method may include mixing two or more liquids prior to coating. The method may include driving the platform in a downhole direction during scraping and in an uphole direction during coating.

Any two or more of the features described in this specification, including in this summary section, may be combined to form implementations not specifically described in this specification.

All or part of the processes, methods, systems, and techniques described in this specification may be controlled by executing, on one or more processing devices, instructions that are stored on one or more non-transitory machine-readable storage media. Examples of non-transitory machine-readable storage media include read-only memory, an optical disk drive, memory disk drive, random access memory, and the like. All or part of the processes, methods, systems, and techniques described in this specification may be controlled using a computing system comprised of one or more processing devices and memory storing instructions that are executable by the one or more processing devices to perform various control operations.

The details of one or more implementations are set forth in the accompanying drawings and the description subsequently. Other features and advantages will be apparent from the description and drawings, and from the claims.

DESCRIPTION OF THE DRAWINGS

FIG. 1 is an example wellbore maintenance system as described in this specification in a wellbore.

FIG. 2A-2D are an example wellbore maintenance system as described in this specification during operation in a wellbore.

DETAILED DESCRIPTION

Described in this specification are technologies for maintaining or repairing casing (including liners) or tubing in a wellbore of an oil or gas field. Casing or tubing that can be maintained using the technologies described in this specification include casing or liners in production wells (wells for extracting hydrocarbons from a hydrocarbon rock formation) or injection wells (wells for injecting fluids into a rock formation). The technologies may be used for cleaning casing or tubing from scale and deposits. The technologies may also be used for inspecting casing or tubing, for example, for inspecting for metal loss due to corrosion or inspecting casing or tubing integrity. The technologies may also be used for maintaining or repairing casing or tubing, for example, sealing defects in the casing or tubing.

Corrosion is commonly associated with operations of a well, for example, an injection well. Corrosion in a well may be characterized by loss of casing or tubing material (for example, metal) due to chemical or electrochemical reactions. In some instances, corrosion may be severe such that casing or tubing may perforate, which may lead to the loss of a casing or tubing structure. In some instances, corrosion in a casing or tubing may be severe such that a casing-casing annulus (CCA) may form between two sections of casing or tubing. For example, two sections of casing or tubing may be connected by concentrically overlap of a distal part of a first casing or tubing section and a proximal part of a second casing or tubing section. The first and second tubing section may be joined, for example, by press fitting or through a layer of cement, which may create a fluid seal. In some instances, corrosion may affect the cement layer or may affect a first or second tubing section such that the fluid seal is at least partially destroyed. Wellbore fluid may enter the casing or tubing, potentially causing contamination or other undesired fluid communication between geological layers. Injection fluid may exit an injection well at an undesired location, potentially causing contamination.

A rate of corrosion may vary with time depending on the particular conditions of a field and depending on the type of chemical exposure. Factors include the amount or flow rate of water produced or injected, pressure variations, chemical composition of fluid produced or injected, and temperatures of fluid or casing or tubing. Detection and remediation of corrosion in a casing or liner may be critical for oil well operation and safety.

During operation of a well, for example, an injection well, solid deposits may form on an internal surface of a casing or tubing. Such deposits may include deposits related to corrosion, such as rust, or may include other types of solids, including wax, scale and debris. Detection and removal of deposits in a casing or liner may be critical for oil well operation efficiency and efficacy.

FIG. 1 illustrates an example system for maintaining or repairing casing (including liners) or tubing in a wellbore of an oil or gas well. An example system may include a moveable platform 100 having an uphole (proximal) end and a downhole (distal) end. A platform 100 may be deployed in a lumen 12 of an example casing string 10 of a wellbore in a rock formation 15. A platform 100 may include a drive arrangement 110 for moving the platform 100 in one or more directions, for example, along an interior wall 11 of casing string 10. A platform 100 may include one or more scraping arrangements 120 for removing debris from the interior wall 11 of the casing string 10. A platform 100 may include one or more debris catching arrangements 130 for collecting debris, for example, some or all of the debris removed by scraping arrangement 120. In some implementations, platform 100 may include a coating arrangement 140, for example, to deliver or apply, or both, a substance to at least a part of wall 11 of the casing string 10.

An example platform 100 may include an example drive arrangement 110 that may include one or more devices to convey platform 100 in one or more directions. In some implementations, a drive arrangement 110 may include one or more wheels 111. One or more wheels 111 may be connected to one or more motors, for example, one or more electric motors. In some implementations, one or more wheels 111 may be connected to a steering arrangement including, for example, a rack and pinion arrangement. One or more wheels may thus be steerable by rotating the one or more wheels about an axis perpendicular to an axis of wheel rotation. A steering arrangement may be actuated by one or more motors, for example, an electric motor, or by a hydraulic or pneumatic arrangement. In some implementations, one or more wheels 111 may be arranged such that controlling or varying the rotation speed of one or more wheels may cause a platform 100 to turn. In an example implementation, one or more wheels may be disposed on a first side (for example, a left side) of a platform 100 when viewing the platform from an uphole (proximal) end along a longitudinal axis of the platform 100. One or more wheels may be disposed on a second side (for example, a right side) of a platform 100. Causing all the wheels to rotate at the same speed may cause the platform 100 to move along a longitudinal axis of platform 100. Reducing the speed of rotation in one or more wheels on the first side (for example, left side) may cause the platform to turn in a first direction (for example, left direction). In some implementations, a drive arrangement 110 may include one or more continuous track and wheel arrangements (caterpillar). In some implementations, rotation speed of one or more wheels or an example steering mechanism may be controlled by an electronic control unit, for example, control unit 400.

An example platform 100 may include an example scraping arrangement 120 for removing debris from the interior wall 11 of the casing string 10. An example scraping arrangement 120 may include one or scraping implements, for example, one or more brushes, blades, drills, mills, lasers, or hammers. In some implementations, example scraping arrangement 120 may include one or more brushes for brushing debris from the wall of the casing string. In some implementations, the one or more brushes may be stationary relative to platform 100 during scraping operation. In some implementations, the one or more brushes may rotate, thereby removing debris from the wall of the casing string. In an example implementation, one or more rotating brushes may be rotated via a mechanism connecting one or more brushes to one or more wheels of drive arrangement 110. For example, the same mechanism that drives one or more wheels of drive arrangement 110, for example, a mechanism including an electric motor, may cause rotation of one or more brushes of an example scraping arrangement 120. In an example implementation, one or more brushes of an example scraping arrangement 120 may be rotated by a mechanism including one or more motors (for example, electric motors) that are not used to drive a wheel of drive arrangement 110. One or more brushes of example scraping arrangement 120 may include steel bristles or polymer bristles or other such implements.

In some implementations, example scraping arrangement 120 may include one or more blades for scraping debris from the wall of the casing string. In some implementations, one or more blades of example scraping arrangement 120 may be moveable, for example, rotatable, for example, rotatable around an axis substantially parallel to a cutting edge of a blade. For example, the same mechanism that drives one or more wheels of drive arrangement 110, for example, a mechanism including an electric motor, may cause rotation of one or more blades of an example scraping arrangement 120. In an example implementation, one or more blades of an example scraping arrangement 120 may be rotated by mechanism including one or more motors (for example, electric motors) that are not used to drive a wheel of drive arrangement 110.

In some implementations, an example scraping arrangement 120 may include one or more scraping implements, for example, one or more brushes or blades, that may be connected to a deployment mechanism that is mounted on or otherwise part of platform 100. In some implementations, the example deployment mechanism, for example, a set of moveable bars, may have a first configuration, for example, a retracted configuration in which the one or more scraping implements do not extend to or substantially contact a wall 11 of casing 10. In some implementations, the example deployment mechanism may have a second configuration, for example, an extended configuration in which the one or more scraping implements extend to or substantially contact a wall 11 of casing 10, for example, to perform a scraping operation. An example deployment mechanism of a scraping arrangement 120 may be actuated by one or more motors, for example, one or more electric motors, or a hydraulic or pneumatic arrangement. Actuation may cause an example mechanism to move from a first, retracted configuration to a second, extended configuration, or vice versa. In some implementations, a scraping arrangement 120 may be adjustable to account for casings 10 of different diameters. In some implementations, a scraping arrangement may include an adjustment mechanism, for example, a mechanism including a spring and a damper connected to one or more scraping implements and connected to one or more other components of platform 100, that maintains contact between a scraping implement and a wall 11. In some implementations, an adjustment mechanism and a deployment mechanism may be combined. In some implementations, deployment or movement of one or more scraping implements may be controlled by an electronic control unit, for example, control unit 400.

An example platform 100 may include an example debris catching arrangement 130 for collecting debris, for example, some or all of the debris removed by scraping arrangement 120. An example debris catching arrangement may include one or more sieves, nets, meshes or wires. In some implementations, a debris catching arrangement 130 may be or may include one or more magnetic components. In some implementations, a debris catching arrangement 130 may include one or more electromagnetic devices connected to an electric power source. In some implementations, activation of one or more electromagnetic devices of one or more catching implements may be controlled by an electronic control unit, for example, control unit 400.

In some implementations, an example debris catching arrangement 130 may include one or more catching implements, for example, one or more sieves, nets, meshes or wires, that may be connected to a deployment mechanism that is mounted on or otherwise part of platform 100. In some implementations, the example deployment mechanism, for example, a set of moveable bars, may have a first configuration, for example, a retracted configuration in which the one or more catching implements do not extend to or substantially contact a wall 11 of casing 10. In some implementations, the example deployment mechanism may have a second configuration, for example, an extended configuration in which the one or more catching implements extend to or substantially contact a wall 11 of casing 10, for example, to catch debris removed from a wall 11. An example deployment mechanism of a debris catching arrangement 130 may be actuated by one or more motors, for example, one or more electric motors, or a hydraulic or pneumatic arrangement. Actuation may cause an example deployment mechanism to move from a first, retracted configuration to a second, extended configuration, or vice versa. In some implementations, deployment or movement of one or more catching implements may be controlled by an electronic control unit, for example, control unit 400.

An example platform 100 may include an example coating arrangement 140, for example, to deliver or apply, or both, a substance to at least a part of wall 11 of the casing string 10. In some implementations, a coating arrangement 140 may include one or more reservoirs for holding one or more liquid substances. A liquid substance to be used with the technologies described in this specification may include a paint, a glue, a polymer, an epoxy resin, an epoxy hardener, or combinations thereof. In some implementations, a coating arrangement 140 may include one or more valves to regulate flow of the liquid substance, for example, out of the one or more reservoirs. In some implementations, actuation of one or more valves may be controlled by an electronic control unit, for example, control unit 400. A coating arrangement 140 may include one or more nozzles fluidly connected to one or more reservoirs via tubing to apply one or more liquid substances to a surface of a wall 11. In some implementations, one or more nozzles may include a mixing arrangement to mix two or more liquids, for example, to mix epoxy resin and epoxy hardener prior to application of the two or more liquids to a wall 11.

In some implementations, an example coating arrangement 140 may include one or coating implements, for example, one or more applicators or nozzles connected via tubing to one or more reservoirs. One or more applicators may be connected to a deployment mechanism that is mounted on or is otherwise part of platform 100. In some implementations, the example deployment mechanism, for example, a set of moveable bars, may have a first configuration, for example, a retracted configuration in which the one or more coating implements do not extend to or substantially contact a wall 11 of casing 10. In some implementations, the example deployment mechanism may have a second configuration, for example, an extended configuration in which the one or more coating implements extend to or substantially contact a wall 11 of casing 10, for example, to apply one or more liquids to a wall 11. An example deployment mechanism of a coating arrangement 140 may be actuated by one or more motors, for example, one or more electric motors, or a hydraulic or pneumatic arrangement. Actuation may cause an example deployment mechanism to move from a first, retracted configuration to a second, extended configuration, or vice versa. In some implementations, deployment of one or more coating implements may be controlled by an electronic control unit, for example, control unit 400. An example reservoir may be pressurized. In some implementations, one or more pumps may be arranged in a fluid connection with one or more reservoirs such that activation of the one or more pumps causes fluid to flow from the one or more reservoirs through tubing and out of one or more nozzles. In some implementations, pumping operation may be controlled by an electronic control unit, for example, control unit 400. A coating arrangement 140 may be moveable independently from the remaining components of platform 100. In some implementations, a coating arrangement 140, for example a deployment mechanism of coating arrangement 140, may be rotatable or translatable around one or more axes.

In some implementations, a system may include a plug 200 positionable downhole of the platform for sealing an interior lumen 12 of casing 10, for example, as shown in FIG. 1. In some implementations, a plug 200 may be removable or retrievable. In some implementations, a plug 200 may include an expandable or inflatable element that may be moved downhole, for example, via wireline operation, and inflated in situ. In some implementations, a plug may be or include one or more sieves, nets, meshes or wires, that may be connected to a deployment mechanism. In some implementations, a plug 200 may not be retrievable after scraping operations but configured to remain in casing string 10. A drill or other implement may be used to drill through or otherwise destroy a plug 200 after completion of scraping or coating operations.

In some implementations, an example system may include a power source. An example power source may be or include an electric power source, for example, an electric generator 300. In some implementations, an example power source, for example, an electric generator 300, may be situated on a surface 25 outside of the wellbore and casing string 10. Power may be transferred from a power source, for example, an electric generator 300, to a platform 100 via one or more power cables. The one or more power cables may be integrated into wireline 190. In some implementations, a power source may be a downhole generator, for example, a generator powered by fluid movement across a set of turbine blades connected to the downhole generator. In some implementations, a power source may be part of platform 100. In some example implementations, a power source that is part of platform 100 may include one or more batteries.

In some implementations, an example system may include a control unit 400. An example control unit 400 may be or include one or more processors and one or more data storage media. In some implementations, an example control unit 400 may be situated on a surface 25 outside of the wellbore and casing string 10. Data may be exchanged between example control unit 400 and a platform 100 via one or more data links, for example, one or more data cables. The one or more data cables may be integrated into wireline 190. In some implementations, one or more or all components of a control unit 400 may be part of platform 100.

In some implementations, an example system may include one or more sensors, for example, one or more sensors attached to or otherwise integrated into platform 100. In some implementations, one or more sensors include one or more of a temperature sensor, a pressure transducer, a gyroscope, a camera, or a laser. In some implementations, a system may include a set of sensors such as ultrasonic transducers, for example, to map an area surrounding the platform 100. In some implementations, one or more wheels of drive arrangement 110 may be equipped with a speed metering device to follow progress of platform 100 while moving. A control system, for example, control system 400, may monitor actual speed vs. command speed, for example, to determine whether a platform 100 is moving unimpeded or is at risk of being stuck. In some implementations, a system as described in this specification may be guided by an operator, for example, interacting with control system 400. In some implementations, a system as described in this specification may operate fully or partly autonomously, for example, as a robotic platform.

An example operation of a system as described in this specification is illustrated in FIGS. 2A-2D. In some implementations, prior to a scraping operations, a plug 200 may be deployed on a delivery string 201 in a casing string 10 downhole (distal) to one or more zones of corrosion or build-up of debris on a wall 11 (FIG. 2A). A zone of corrosion or build-up of debris may have previously been detected using, for example, a system as described in this specification, for example, one or more sensors on a platform 100. In some implementations, a plug 200 may include an expandable or inflatable element that may be contracted or deflated during transit from a surface 25 to a target location. Once in target position, expandable or inflatable element of plug 200 may be expanded or inflated to immobilize the plug 200 in position, for example, by pumping fluid into expandable element, causing the expandable element to at least partially contact wall 11 to immobilize plug 200. In some implementations, one or more sieves, nets, meshes, or wires that are part of plug 200 may be deployed. In some implementations, an expandable element or one or more sieves, nets, meshes or wires, or combinations thereof, may completely seal off a lumen 12 of casing 10. After deployment of plug 200, a delivery string may be retrieved uphole.

In some implementations, platform 100 may be lowered into a lumen 12 of a casing string 10, for example, via a wireline operation, for example, to or near a zone of corrosion or build-up of debris. In some implementations, a platform 100 may be self-propelled, for example, through one or more wheels in contact with a wall 11 of casing string 10, and may drive to or through a zone of corrosion or build-up of debris (see, e.g., FIG. 2B). Arrival of a platform 100 on or near a zone of corrosion or build-up of debris may be indicated, for example, through one or more optical sensors, for example, one or more cameras, directed at a wall 11 and conveying image data to control system, for example, control system 400. In some implementations, a user operating a control system 400 may deploy one or more debris catching arrangements 130 and one or more scraping arrangements 120. In some implementations, for example, in a robotic implementation of a system as described in this specification, a control system 400 may cause one or more debris catching arrangements 130 and one or more scraping arrangements 120 to be deployed without user interaction. In some implementations, deployment of one or more scraping arrangements 120 includes contacting one or more scraping implements to a wall 11. In some implementations, downhole movement of platform 100 may cause one or more scraping implements to contact and dislodge debris from wall 11. In some implementations, uphole movement of platform 100 may cause one or more scraping implements to contact and dislodge debris from wall 11. In some implementations, scraping may occur or may be assisted at least in part by movement of one or more scraping implements independent from movement of platform 100. In an example implementation, one or more scraping implements may be or include rotating brushes or blades that may contact and dislodge debris from wall 11. Debris dislodged from wall 11 may be caught by one or more debris catching arrangements 130. In some implementations, for example, in a vertical well, a debris catching arrangement 130 may be downhole (distal) of a scraping arrangement 120 and may catch falling debris, for example, using one or more sieves, nets, meshes, or wires. Debris, for example, debris caused by ferrous build-up due to corrosion, may be ferromagnetic. In some implementations, a debris catching arrangement 130 may be or include one or more magnetic components, for example, one or more electromagnetic components or devices (for example, a mesh or sieve) connected to an electronic power source. In some implementations, during scraping operation, an electromagnetic component may be energized, which may cause debris to adhere to the one or more electromagnetic components. In some implementations, a debris catching arrangement 130 may remain deployed during retrieval of platform 100 (uphole movement of platform 100) to extract caught debris from casing string 10. In some implementations, debris catching arrangement 130 may be retracted during retrieval of platform 100 (uphole movement of platform 100). Debris not caught by debris catching arrangement 130 may be caught by plug 200.

After completion of a scraping operation, one or more defects (for example, holes or cracks) may be present in a wall 11 of casing 10. In some implementations, a user operating a control system may deploy one or more coating arrangements 140. In some implementations, for example, in a robotic implementation of a system as described in this specification, a control system 400 may cause one or more coating arrangements 140 to be deployed without user interaction. In some implementations, one or coating implements, for example, one or more applicators or nozzles connected via tubing to one or more reservoirs holding one or more fluids, may be deployed to contact or to be placed in proximity to a wall 11. Fluid, for example, a liquid coating, for example epoxy resin and hardener, may be pumped from one or more reservoirs through one or more nozzles and applied to a wall 11. In some implementations moving one or more nozzles during pumping, for example, by rotating or translating coating arrangement 140 or a part thereof, or by translating platform 100, may cause an area of wall 11 to be coated, for example, uniformly coated. In some implementations, coating quality may be assessed, for example, by visual inspection using one or more optical sensors mounted on a platform 100.

After completion of a scraping or coating procedure, a lumen 12 of a casing string 10 may be reopened, for example, by removing plug 200 (FIG. 2D). In some implementations, a retrieval string may be lowered downhole and connected to plug 200. In some implementations, an inflated inflatable element may be deflated or an expandable element may be retracted. Plug 200 may then be retrieved and moved uphole, for example, using a retrieval string 202. In some implementations, a plug 200 may not be retrieved after scraping operations but may remain in casing string 10. A drill or other implement may be used to drill through or otherwise destroy a plug 200 after completion of scraping or coating operations.

It should be understood that the operations described in this specification may be carried out in a vertical well or a horizontal well.

At least part of the system described in this specification and its various modifications may be controlled by a computer program product, such as a computer program tangibly embodied in one or more information formation carriers. Information carriers include one or more tangible machine-readable storage media. The computer program product may be executed by a data processing apparatus. A data processing apparatus can be a programmable processor, a computer, or multiple computers.

A computer program may be written in any form of programming language, including compiled or interpreted languages. It may be deployed in any form, including as a stand-alone program or as a module, component, subroutine, or other unit suitable for use in a computing environment. A computer program may be deployed to be executed on one computer or on multiple computers. The one computer or multiple computers can be at one site or distributed across multiple sites and interconnected by a network.

Actions associated with implementing the systems may be performed by one or more programmable processors executing one or more computer programs. All or part of the systems may be implemented as special purpose logic circuitry, for example, a field programmable gate array (FPGA) or an ASIC application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media. Machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks, for example, internal hard disks or removable disks, magneto-optical disks, and CD-ROM and DVD-ROM disks.

Each computing device may include a hard drive for storing data and computer programs, a processing device (for example, a microprocessor), and memory (for example, RAM) for executing computer programs.

Components of different implementations described in this specification may be combined to form other implementations not specifically set forth in this specification. Components may be left out of the systems described in this specification without adversely affecting their operation.

What is claimed:

1. A system for corrosion remediation in a casing string in a wellbore, the system comprising:
    a moveable platform having an uphole end and a downhole end, the platform comprising:
        a drive arrangement for moving the platform in one or more directions along an interior wall of the casing string in a wellbore;
        a scraping arrangement for removing debris from the interior wall of the casing string, where the scraping arrangement comprises one or more brushes for brushing debris from the wall of the casing string, where bristles of the one or more brushes include at least one of steel bristles and polymer bristles; and
        a debris catching arrangement downhole of the scraping arrangement for collecting some or all of the debris removed,
        where the debris catching arrangement comprises an electromagnetic device for catching some or all of the debris removed, where the electromagnetic device comprises at least one of a mesh and a sieve for catching some or all of the debris removed, and where energizing the electromagnetic device causes some or all of the debris removed to adhere to the at least one of the mesh and the sieve, and
        where the scraping arrangement comprises one or more blades for scraping debris from the wall of the casing string, wherein the one or more blades are connected to a set of movable bars, which may be extended to substantially contact the interior wall of the casing string, where the scraping arrangement comprises a pneumatic arrangement for extending the movable bars, and where the scraping arrangement includes an adjustment mechanism for the scraping arrangement, where the adjustment mechanism comprises a spring and a damper.

2. The system of claim 1, where the platform comprises a coating arrangement downhole of the debris catching arrangement to deliver and apply a substance to at least a part of the wall of the casing string.

3. The system of claim 2, where the coating arrangement comprises a reservoir holding one or more liquid substances and a valve to regulate flow of the one or more liquid substances out of the reservoir.

4. The system of claim 3, where the liquid substance comprises epoxy resin.

5. The system of claim 4, where the plug is removable, where the plug comprises an expandable element that may be expanded by pumping fluid into the expandable element to immobilize the plug in position, and where the plug is drillable.

6. The system of claim 3, wherein coating arrangement comprises one or more nozzles fluidly connected to the reservoir via tubing to apply one or more liquid substances to the interior wall of a casing string,
where the one or more liquid substances comprises epoxy resin and hardener, and
where the reservoir is pressurized.

7. The system of claim 6, wherein each of the one or more nozzles includes a mixing arrangement to mix the epoxy resin and hardener.

8. The system of claim 1, where the drive arrangement comprises one or more wheels, where one or more of the one or more wheels are each equipped with a speed metering device to follow the progress of the platform.

9. The system of claim 8, where the debris catching arrangement is at least partially magnetic.

10. The system of claim 1, where the drive arrangement comprises one or more continuous track and wheel arrangements, each said continuous track and wheel arrangement being in a caterpillar arrangement.

11. The system of claim 1, where the one or more brushes are stationary relative to the platform.

12. The system of claim 1, the drive arrangement comprising one or more wheels, where the one or more brushes rotate, thereby removing debris from the wall of the casing string, and
where the one or more brushes are rotated via a mechanism connecting the one or more brushes to the one or more wheels of the drive arrangement.

13. The system of claim 1, comprising a plug positioned downhole of the platform for sealing an interior lumen of the casing.

14. The system of claim 1, comprising a power source in electrical communication with the platform to provide electrical power to one or more components of the platform,
where the removed debris comprises ferromagnetic material.

15. The system of claim 1, comprising a control unit in data communication with the platform to control one or more components of the platform,
where the debris catching arrangement is configured to be retracted during retrieval of the movable platform, and where retrieval of the moveable platform comprises uphole movement of the moveable platform.

16. A method for corrosion remediation in a casing string in a wellbore, the method comprising:
driving, along an interior wall of at least a first portion of a casing, a moveable platform having an uphole end and a downhole end, the platform comprising
a drive arrangement;
a scraping arrangement;
a debris catching arrangement downhole of the scraping arrangement, where the debris catching arrangement comprises an electromagnetic device for catching debris and where the electromagnetic device comprises at least one of a mesh and a sieve for catching debris; and
a coating arrangement;
removing, by the scraping arrangement, the debris from the interior wall of the casing string;
collecting, by the debris catching arrangement, at least some of the debris removed, where collecting the debris removed comprises energizing the electromagnetic device to cause at least some of the debris removed to adhere to the at least one of the mesh and the sieve;
mixing, by the coating arrangement, two or more liquids prior to coating, where the two or more liquids comprise an epoxy resin and an epoxy hardener;
coating, using the coating arrangement, an interior wall of at least a second portion of the casing with the mixture of the two or more liquids; and
driving the platform in a downhole direction during scraping and in an uphole direction during coating,
where the platform comprises a set of one or more ultrasonic transducers and the method comprises mapping an area surrounding the platform using the set of one or more ultrasonic transducers.

17. The method of claim 16, comprising deploying a plug downhole of at least the first portion to seal off a lumen of the casing string.

18. The method of claim 17, wherein the plug comprises an expandable element and wherein the expandable element of the plug is expanded by pumping fluid into the expandable element.

19. The method of claim 18, where the coating arrangement comprises a reservoir for holding one or more liquid substances and a valve to regulate flow of one or more liquid substances out of the reservoir.

20. The method of claim 19, where the method comprises operating the system fully or partly autonomously.

21. The method of claim 20, where the drive arrangement comprises one or more wheels and where at least one of the one or more wheels are each equipped with a speed metering device to follow progress of the platform and where the method comprises monitoring the speed of the platform using the speed metering device(s).

* * * * *